Feb. 8, 1966  O. ROGG  3,233,519
GEAR SHAPING MACHINE
Filed Nov. 27, 1961  4 Sheets-Sheet 1

INVENTOR.
Otto Rogg
BY Michael J. Striker
his ATTORNEY

Feb. 8, 1966    O. ROGG    3,233,519
GEAR SHAPING MACHINE

Filed Nov. 27, 1961    4 Sheets-Sheet 2

INVENTOR.
Otto Rogg
BY
Michael S. Striker
his ATTORNEY

Feb. 8, 1966 O. ROGG 3,233,519
GEAR SHAPING MACHINE
Filed Nov. 27, 1961 4 Sheets-Sheet 3

INVENTOR.
Otto Rogg

INVENTOR.
Otto Rogg
BY
Michael S. Striker
his ATTORNEY

United States Patent Office 3,233,519
Patented Feb. 8, 1966

3,233,519
GEAR SHAPING MACHINE
Otto Rogg, Munich, Germany, assignor to Carl Hurth Maschinen- und Zahnradfabrik, Munich, Germany
Filed Nov. 27, 1961, Ser. No. 155,042
Claims priority, application Germany, Nov. 29, 1960, H 41,074
9 Claims. (Cl. 90—4)

The present invention relates to gear shaping machines in general, and more particularly to a machine which is especially suited for shaping of spur and helical gears by means of a worm-like shaping tool.

An important object of the invention is to provide a gear shaping machine wherein the rotary motion transmitting connection between the tool and the workpiece comprises a small number of groupwise arranged mating gears, and wherein the mating gears or splines which directly transmit rotary motions to the tool spindle operate without backlash when the machine is in actual use.

Another object of the invention is to provide a machine of the just outlined characteristics wherein the tool slide and the work slide are movable in their respective guides without any or with minimal lateral play.

A further object of the invention is to provide a gear shaping machine wherein the speed change gears and the index change gears are mounted in the tool slide and are readily accessible to the operator so that the operator may inspect, adjust or exchange these gears in fully erected position, that is, without bending.

An additional object of the invention is to provide a machine of the above outlined characteristics wherein the gear shaping station is readily accessible to the operator to permit convenient removal or insertion of the tool and/or of the workpiece.

A further object of the instant invention is to provide a novel backlash- and vibration-eliminating arrangement between the mating gears and/or splines in one or more motion-transmitting groups of the gear shaping machine.

A concomitant object of the invention is to provide a gear shaping machine in which the source of power is mounted in and thus adds to the weight of the tool slide.

With the above objects in view, the invention resides in the provision of a gear shaping machine comprising a tool slide which is reciprocably mounted on the machine frame, a driven main shaft which is rotatably mounted in the tool slide, a tool holder which is mounted on the tool slide and is turnable about the axis of the main shaft, and index change gear means including a gear mounted on and driven by the main shaft.

Certain other features of the invention reside in the mounting of the main drive motor in the tool slide, in the mounting of the index change gear and speed change gear in the tool slide, in the provision of a special backlash eliminating arrangement between the teeth of gears which transmit rotary motion to the tool spindle, in the provision of a special driving connection between the main shaft and the work spindle, in special mounting of the work spindle, and in such mounting of the tool- and work-slides on the machine frame that the gear shaping station is readily accessible to an operator for inspection, removal or replacement of the toll and/or the workpiece.

The novel features which are considered as characteristic of the invention are set forth in particular in the appended claims. The invention itself, however, both as to its contruction and its method of operation, together with additional objects and advantages thereof, will be best understood from the following detailed description of certain specific embodiments with reference to the accompanying drawings, in which:

FIG. 1b is a fragmentary axial section through the tool slide as seen in the direction of arrows from the line Ib—Ib of FIG. 1a;

Figure 5:
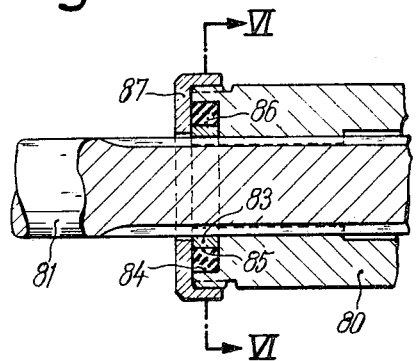
Figure 6:
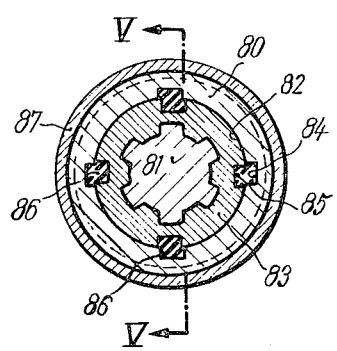

FIG. 5 is a fragmentary axial sectional view of an externally splined tool spindly and of an internally splined sleeve which transmits rotary motion to this spindle, further showing a backlash-eliminating arrangement which is mounted in the sleeve, the section of FIG. 5 being taken in the direction of arrows as seen from the line V—V of FIG. 6; and FIG. 6 is a transverse section as seen in the direction of arrows from the line VI—VI of FIG. 5.

Figure 1:
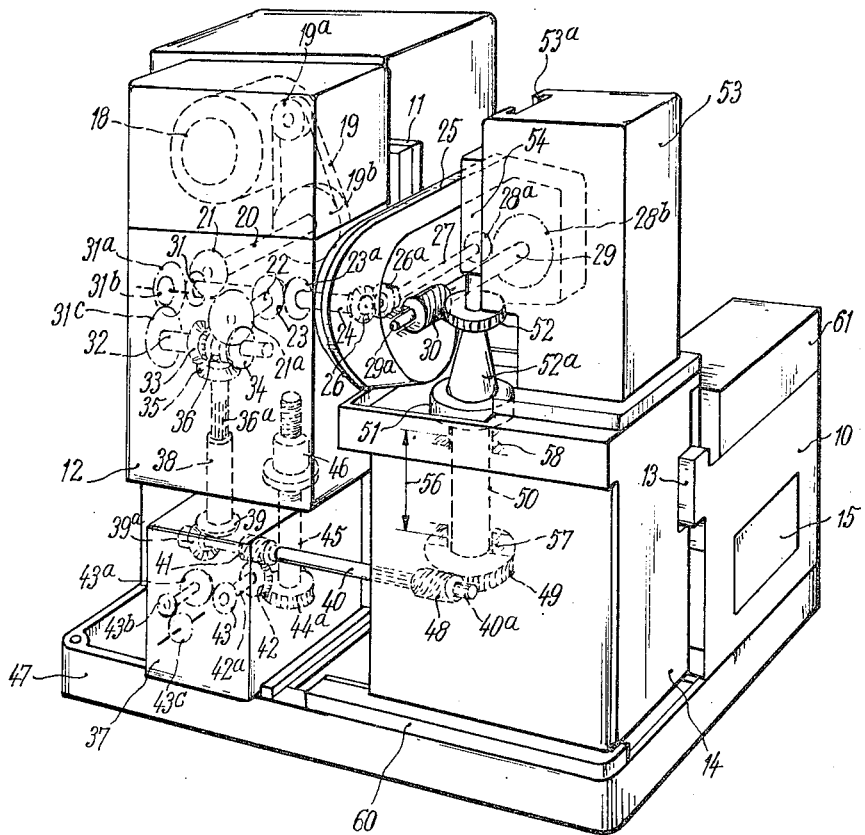
FIG. 1 is a somewhat schematic perspective view of a gear shaping machine which embodies my invention.
Figure 2:
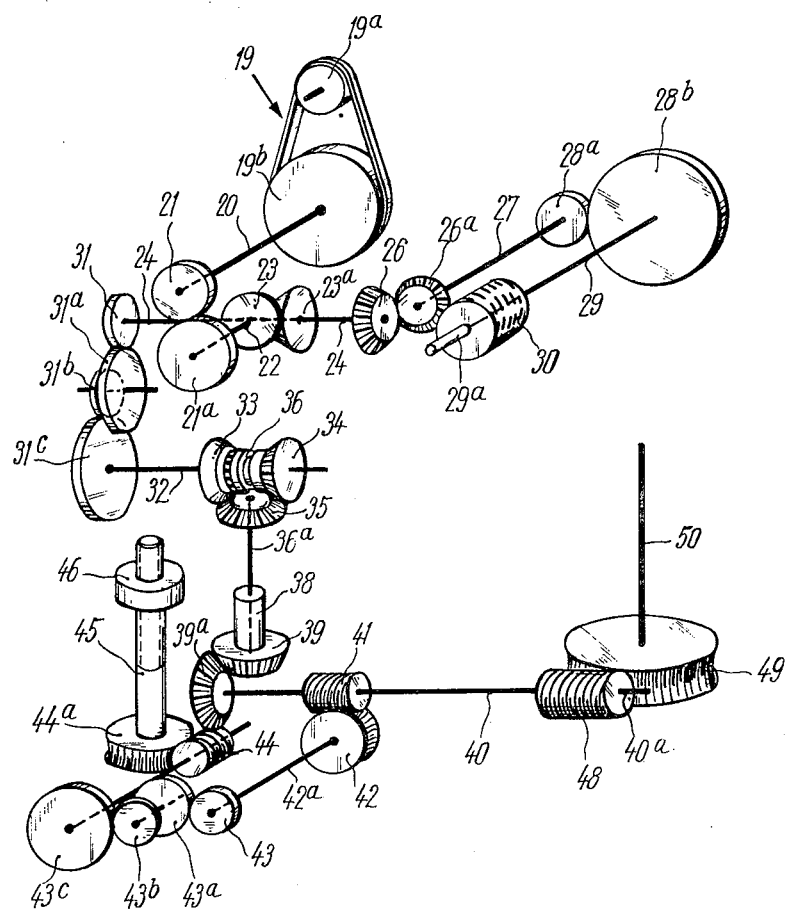
FIG. 2 is a schematic perspective view of various groupwise arranged motion transmitting, reversing and speed changing gears forming part of the machine shown in FIG. 1.

Referring now in greater detail to the illustrated embodiments, and first to FIGS. 1 and 2, there is shown a gear shaping machine which comprises a base or frame 10 supporting a vertical guide 11 for a reciprocable tool slide 12, and a horizontal guide 13 for a reciprocable work slide 14. As shown in FIG. 1, the guides 11, 13 are mounted on the vertical front end wall of the base 10 and control the direction of reciprocatory movement of the slides 12, 14 in such a way that these slides travel in paths which enclose right angles with each other. The guides 11, 13 may but need not be disposed in a common vertical plane. The frame 10 defines an internal chamber which accommodates a withdrawable shavings-collecting pan 15.

Figure 1A:
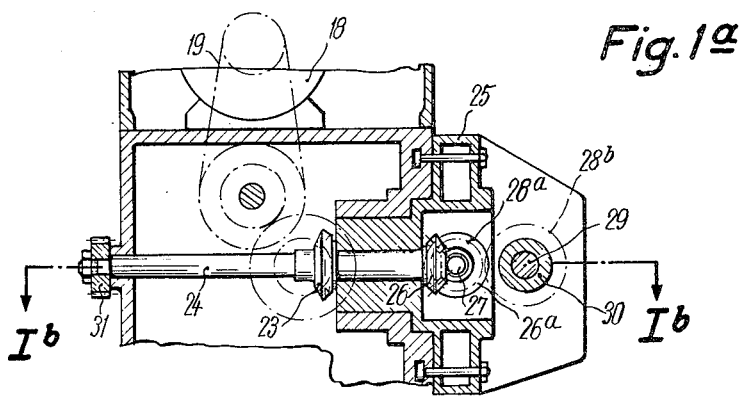
FIG. 1a is a fragmentary axial section through the tool slide as seen in the direction of arrows from the line Ia—Ia of FIG. 1b.
Figure 1B:
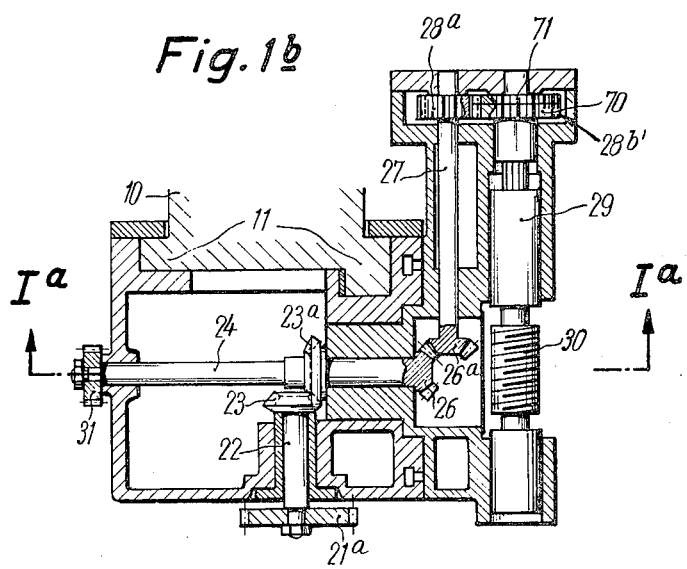

In the upper portion of the tool slide 12, there is provided a source of power in the form of an electric motor 18 which operates a V-belt drive including a pair of multigroove sheaves or pulleys 19a, 19b and a series of V-belts 19. The pulley 19b is mounted at one end of and drives a shaft 20 whose other end carries a spur gear 21 forming part of a speed change gear which, in the embodiment of FIGS. 1 and 2, includes a second spur gear 21a meshing with the gear 21, a shaft 22 which is driven by the gear 21a, and a bevel gear 23 which is driven by the shaft 22. The speed change gear determines the r.p.m. of the tool. The bevel gear 23 of this speed change gear drives a bevel gear 23a which is mounted on and rotates a horizontal main shaft 24 whose righthand portion projects from the tool slide 12 and into a turnable tool holder or carrier 25. The latter is mounted on the tool slide 12 and is turnable about the axis of the main shaft 24. As shown in FIGS. 1a and 1b, the tool holder 25 may be arrested in one or more angular positions of adjustment with respect to the slide 12.

The driven main shaft 24 carries at its right-hand end a bevel gear 26 which mates with a bevel gear 26a mounted at one end of a shaft 27 which is rotatably mounted in the tool holder 25 and whose other end carries a pinion 28a. This pinion in turn meshes with a spur gear 28b which is mounted on a spindle 29 for the substantially worm-shaped tool 30. In the embodiment of FIGS. 1 and 2, the tool 30 is assumed to be a hob. The two groups of mating toothed gears 26, 26a and 28a, 28b constitute a driving connection between the main shaft 24 and the tool spindle 29. That end face of the tool 30 which is turned away from the spindle 29 is supported by a suitable backrest 29a.

The left-hand end of the main shaft 24 removably carries one spur gear 31 of a gear train or group constituting an index change gear which also includes gears 31a, 31b, 31c, the latter mounted on a horizontal shaft 32 forming part of another group constituting a reversing gear. In the illustrated embodiment, the reversing gear includes a pair of spaced bevel gears 33, 34 which are freely rotatable on the shaft 32 and which are in permanent mesh with a driven bevel gear 35 mounted at the upper end of a splined shaft 36a, and a clutch sleeve 36 which is driven by and is slidable along the shaft 32. This sleeve is provided with a set of teeth at each of its axial ends so that it may alternately engage with complementary teeth of the gear 33 or 34 in order to drive the bevel gear 35 and the splined shaft 36a in clockwise or anticlockwise direction. The control lever which shifts the sleeve 36 along the shaft 32 into engagement with the gear 33 or 34 is not shown in the drawings. The purpose of the reversing gear is to drive the work spindle 50 in clockwise or anticlockwise direction.

The lower end of the splined shaft 36a extends from the underside of the tool slide 12 and into a stationary housing 37 which is fixed to the bedplate 47 of the machine. The housing 37 accommodates an internally splined rotary cylinder 38 which receives the splined lower end of the shaft 36a and transmits rotary motion to a bevel gear 39 meshing with a bevel gear 39a mounted at the left-hand end of a worm shaft 40. The splined shaft 36a and the cylinder 38 constitute a third group of gears which forms part of the driving connection between the main shaft 24 and the work spindle 50. Owing to the fact that the cylinder 38 is rotatably mounted in the stationary housing 37 and that the splined shaft 36a is free to perform axial movements with respect to the cylinder 38, the connection between the reversing gear and the worm shaft 40 is not interrupted when the tool slide 12 is caused to reciprocate in its guide 11. The bevel gears 39, 39a constitute a fourth group of mating gears in the driving connection between the main shaft 24 and the work spindle 50.

The tool slide 12 is reciprocated in the following manner: The worm shaft 40 carries a worm 41 which is located in the housing 37 and which meshes with a worm wheel 42 mounted on the input shaft 42a of a feed change gear. This feed change gear further includes a gear train 43, 43a, 43b, 43c, the latter mounted on and driving a worm shaft (see FIG. 2) whose worm 44 meshes with a worm wheel 44a mounted at the lower end of a vertical feed spindle or screw 45. The upper portion of the screw 45 projects into the tool slide 12 and meshes with an internally threaded spindle nut 46 which is rigidly mounted in the slide 12 so that rotary movements of the screw 45 in clockwise or anticlockwise direction will compel the slide 12 to move up or down in its guide 11. The feed change gear 42a–43c selects the speed at which the slide 12 is moved in its guide 11. It is preferred to provide some means for eliminating any, even slightest, traces of backlash between the meshing threads of the screw 45 and spindle nut 46. Owing to the fact that the housing 37 of the feed change gear 43–43c is mounted directly on the bedplate 47, and owing to the fact that the feed screw 45 is held against axial movements with respect to the housing 37, the slide 12 cannot bring about any displacements of the screw 45 when it reciprocates in the guide 11.

The right hand portion 40a of the worm shaft 40 is splined and projects into the lower part of the work slide 14 where it meshes with an internally splined worm 48 so that the latter may perform axial movements with respect to but is compelled to share all angular movements of the shaft 40. The worm 48 drives a worm wheel 49 which is provided at the lower end of the work spindle 50. The worm 48 and the worm wheel 49 constitute the fifth and last group of gears in the driving connection between the main shaft 24 and the work spindle 50. The head 51 of the spindle 50 may assume the form of a chuck or a like retaining means for the workpiece 52.

The work slide 14 is engaged by a horizontal retaining rail 60 which is fixed to the bedplate 47 so as to prevent any lateral play but to permit horizontal reciprocatory movements of the slide 14 along the guide 13. The upper portion 53 of the slide 14 constitutes a backrest and is provided with vertical ways 53a for a tailstock 54 which engages the upper end of the workpiece 52, i.e. of the mandrel 52a on which the workpiece is mounted. The tailstock 54 is vertically adjustable in the ways 53a.

The gears and eventually the motor for effecting feed movements of the slide 14 along the guide 13 are accommodated in a gear box 61 which is mounted on the base 10. The exact construction of the feed change gears in the box 61 forms no part of this invention.

The work spindle 50 is rotatably mounted in a pair of spaced bearings 57, 58 which are provided in the work slide 14 and whose distance 56 preferably exceeds the distance between the upper bearing 58 and the workpiece 52. Such mounting of the spindle 50 insures that the workpiece is properly supported during a gear shaping operation, particularly since the diameter of the spindle is comparatively large as clearly shown in FIG. 1. Such machine may be utilized for shaping of very large gears and enables the tool 30 to remove thick shavings during each pass along the workpiece.

It will be readily understood that the relative positions of the shaft 40 and the spindle 50 may be changed if desired, and also that the distance 56 between the bearings 57, 58 may be further increased to improve the stability of the workpiece 52. The exact position of the bearings 57, 58 depend on the mounting of a so-called tensioning cylinder or chuck motor (not shown) which may be provided directly at the end of the spindle 50 or at a point adjacent thereto. In the latter instance, the action of the tensioning cylinder may be transmitted to the point where tension is applied by means of a two-armed lever or the like.

As shown in FIG. 1, the arrangement of parts in the gear shaping machine of my invention is such that the operator may move into immediate proximity of the gear shaping station. This enables the operator to rapidly and conveniently exchange the tool 30 and/or the workpiece 52. For the same reason, the operator may reach and exchange the gear 21 or 31 if he desires to respectively change the r.p.m. of the tool 30 or the indexing of the workpiece.

It is well known that the quality of objects treated in a gear shaping machine depends on the dynamic behavior of the machine, i.e. on the various motion transmitting gears on the one hand, and on the machine frame and slides on the other hand. As regards the construction and mounting of gears, it is very important that the rotation-transmitting connection between the workpiece and the shaping tool be as short as possible and that the gears in the groups of gears constituting this connection should transmit motion with little or no backlash. The frame and the slides should be rigid enough to withstand the stresses which arise when the machine is in operation and, in addition, the slides should be mounted in such a way as to prevent them from being lifted off the bedplate or from moving with lateral play in their respective guides. The arrangement of parts as shown in FIG. 1 has been found to constitute an optimum solution as regards the relation of various gears to the frame and to the slides, as well as the position of the various gears with respect to the tool slide, to the work slide, to the tool holder and/or to the work spindle.

Referring back to FIGS. 1 and 2, it will be noted that there are only two groups of meshing gears in the driving connection between the main shaft 24 and the tool spindle 29, namely, a first group including the bevel gears 26, 26a which transmit rotary motion of the main shaft 24 to the shaft 27, and a second group including the spur gears 28a, 28b which transmit rotary motion of the shaft 27 to the tool spindle 29. On the other hand, there are only five groups of meshing gears for transmitting rotary motion of the main shaft 24 to the work spindle 50, namely, a first group including the gears 31–31c which drive the shaft 32, a second group including the gears 33–35 and the clutch sleeve 36 which drives the shaft 36a, a third group including the shaft 36a and the cylinder 38 which latter drives the gear 39, a fourth group including the gears 39, 39a which drive the shaft 40, and a fifth group including the parts 48, 49 which drive the work spindle 50. In the embodiment of FIGS. 1 and 2, there are no axially movable parts for transmitting rotation of the main shaft 24 to the tool spindle 29; this improves the dynamic behavior of the driving connection. An additional important advantage of the machine shown in FIG. 1 is that the motor 18 is mounted in the tool slide 12 because the weight of the motor is added to the weight of the slide. The weight of the slide 12 is further increased due to the fact that it accommodates the gear 21, 21a, the gear 31–31c and the reversing gear 33–36; in addition, and as mentioned hereinabove, such mounting of the gears 21–21a and 31–31c enables the operator to reach these gears without bending.

Figure 3:
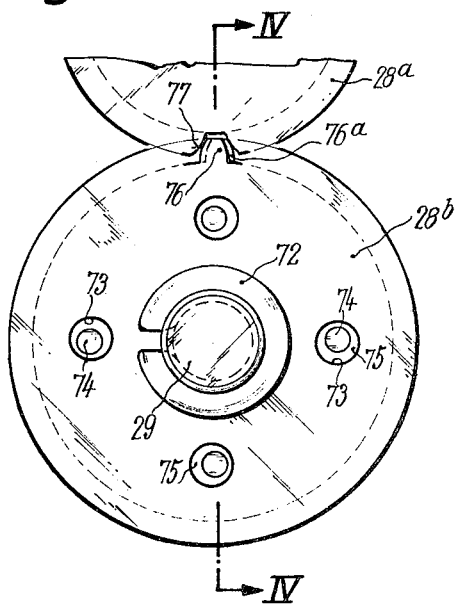
FIG. 3 is a fragmentary front elevational view of a pair of meshing spur gears which transmit rotary motion to the tool spindle of the machine shown in FIG. 1.
Figure 4:
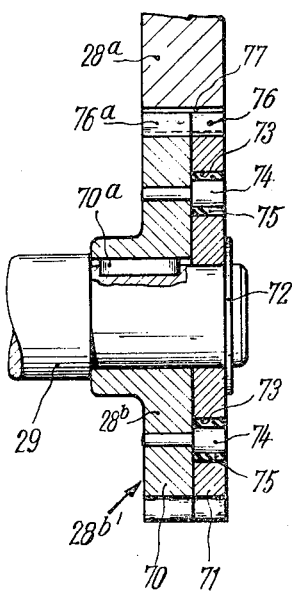
FIG. 4 is an axial section through the spur gears as seen in the direction of arrows from the line IV—IV of FIG. 3, showing a backlash-eliminating arrangement which is incorporated in the driven spur gear.

Referring to FIGS. 3, and 4, there is shown a composite spur gear 28b' which may be used as a substitute for the spur gear 28b of FIGS. 1 and 2. The gear 28b' comprises a main gear element 70 and an auxiliary gear element 71 both of which are mounted on the tool spindle 29. The main gear element 70 is non-rotatably secured to the spindle 29 by a key 70a and drives this spindle when receiving rotary motion from the pinion 28a. The auxiliary gear element 71 is rotatable on the spindle 29 and is held against axial movements by a washer 72 which may assume the form of a split ring and is received in an annular groove of the spindle 29. The element 71 is provided with several preferably uniformly spaced axially parallel bores 73 each of which receives the head of a bolt 74, and the stems of these bolts are screwed into or are otherwise anchored in the main gear element 70. As shown in FIG. 3, the heads of the bolts 74 are eccentrically received in the respective bores 73, and each of these heads is surrounded by a ring 75 of elastically deformable rubber-like material which tends to move the heads of bolts 74 into coaxial alignment with the respective bores 73. Consequently, the rings 75 always tend to bias the flanks of teeth 76 on the auxiliary gear element 71 into abutment with the flanks of teeth 77 on the pinion 28a in order to eliminate any play between this pinion and the composite spur gear 28b'. In other words, when the teeth 76 of the element 71 are aligned with the correlated teeth 76a of the main gear element 70, the bolts 74 deform the rings 75 to store energy in these rings and to insure that the rings bias the teeth 76 in a sense to move them out of alignment with the teeth 76a of the element 70 as soon as the teeth 76a do not bear against the teeth 77 of the pinion 28a. The deformable rings 75 simultaneously prevent transmission of vibrations to the spindle 29 and reduce the noise of the gear shaping machine. Thus, the composite spur gear 28b' serves as a vibration-, noise- and backlash-eliminating means to insure that rotary movements of the tool spindle are exceptionally smooth and that this spindle immediately reacts to any changes in rotational speed of the main shaft 24.

Similar backlash-eliminating systems may be provided in other sections of the gear shaping machine, e.g. between the components 21, 21a of the speed change gear, between the components 31b and 31c of the index change gear, between the components of the feed change gear in the housing 37, etc.

FIGS. 5 and 6 illustrate a modified tool spindle 81 which replaces the spindle 29 of FIGS. 1–4. This modified spindle is externaly splined and is axially movably received in an internally splined sleeve 80. The latter is assumed to be connected with and to receive motion from the spur gear 28b. At its rear end, the sleeve 80 is formed with a countersunk bore 82 whose diameter exceeds the diameter of the spindle 81 and which receives an internally splined hard ring 83 of such configuration as to snugly receive a portion of the splined spindle 81. The internal surface of the bore 82 and the external surface of the ring 83 are respectively provided with slightly misaligned pairwise arranged axially parallel recesses 84, 85 and each pair of these recesses receives an elastically deformable rubber-like wedge or bar 86. The ring 83 is retained in the bore 82 by a screw cap 87 which is screwed onto the externally threaded portion of the sleeve 80. In their unstressed condition, the wedges 86 are of rectangular cross-section and are deformed when they are received in the respective pairs of recesses 84, 85 which means that they tend to turn the ring 83 with respect to the sleeve 80 and thereby bias the external splines of the spindle 81 into abutment with the internal splines of the sleeve 80. In other words, the arrangement of FIGS. 5, 6 performs the same function as the arrangement of FIGS. 3, 4 by eliminating backlash and by preventing the transmission of vibrations to the spindle 81 and hence to the non-illustrated tool which is mounted on this spindle. Similar backlash-eliminating combinations 82–87 may be provided between the shaft 36a and the sleeve 38 and/or between the shaft portion 40a and the worm 48 of FIG. 1.

It will be readily understood that the gear shaping machine of my invention may embody other types of backlash-eliminating systems as long as such systems effectively prevent or reduce to a permissible minimum the backlash between the meshing components and the transmission of vibrations to the spindles 29, 50.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a hobbing machine, in combination, frame means including vertical end wall means; a horizontal guide provided in said vertical end wall means; a vertical guide provided in said vertical end wall means laterally spaced from said horizontal guide and extending in upward direction therefrom; a tool slide reciprocably mounted in one of said guides; a work slide reciprocably mounted in the other of said guides, said tool slide being slidable on the respective guide in a direction normal to the direction of sliding of said work slide on the respective guide, and said work slide being slidable on the respective guide normal to the direction of sliding of said tool slide on its guide; a stationary motion transmitting arrangement stationarily mounted on said frame in a region located under said vertical guide and spaced in transversal direction from said horizontal guide; drive means mounted on one of said slides; first rotary motion transmitting means connecting said drive means with said stationary motion transmitting arrangement, said first rotary motion transmitting means constructed so as to be adapted to transmit motion to said stationary motion transmitting arrangement despite movement of the slide carrying said drive means along the guide on which it is mounted; first rotary mounting means mounted on the other of said slides rotatably about an axis extending parallel to the axis of rotation of said first rotary motion transmitting means and projecting into the space located above said horizontally movable slide and transversely spaced from said vertically movable slide; second rotary motion transmitting means connecting said stationary motion transmitting arrangement with said first rotary mounting means and extending normal to said first rotary motion transmitting means, said second rotary motion transmitting means constructed so as to be adapted to transmit rotary motion to said first rotary mounting means despite movement of the slide carrying said first rotary mounting means along the guide on which it is mounted; second rotary mounting means mounted on said one of said slides rotatably about an axis extending parallel to the axis of rotation of said second rotary motion transmitting means, connected at one end of said drive means and projecting with its other end also into the space located above said horizontally movable slide and transversely spaced from said vertically movable slide; a work holder and a tool holder, one of said holders mounted on said first rotary mounting means and adapted to be rotated by said second rotary motion transmitting means and the other of said holders mounted on said second rotary mounting means and adapted to be rotated by said drive means, said tool holder and said work holder being located in the space above said horizontally movable slide and transversely spaced from said vertically movable slide.

2. The combination as set forth in claim 1, wherein said vertical end wall means includes an upright substantially L-shaped end wall having a horizontal portion having a top face and a vertical portion projecting upwardly from one end of said horizontal portion beyond said top face thereof, said portions having end faces located in a common vertical plane, said vertical guide being provided in said end face of said vertical portion and said horizontal guide being provided in said end face of said horizontal portion.

3. In a hobbing machine, in combination, frame means including vertical end wall means; a horizontal guide provided in said vertical end wall means; a vertical guide provided in said vertical end wall means laterally spaced from said horizontal guide and extending in upward direction therefrom; a vertically movable tool slide reciprocably mounted on said vertical guide; a horizontally movable work slide reciprocably mounted on said horizontal guide, said tool slide being slidable on said vertical guide in a vertical direction normal to the horizontal direction of sliding of said work slide on said horizontal guide, and said work slide being slidable on said horizontal guide normal to the vertical direction of sliding of said tool slide on its vertical guide; a stationary motion transmitting arrangement stationarily mounted on said frame in a region located under said vertical guide and spaced in transversal direction from said horizontal guide; drive means mounted on said tool slide; first rotary motion transmitting means connecting said drive means with said stationary motion transmitting arrangement, said first rotary motion transmitting means constructed so as to be adapted to transmit motion to said stationary motion transmitting arrangement despite movement of said tool slide carrying said drive means along said vertical guide on which it is mounted; rotary work mounting means mounted on said work slide rotatably about a vertical axis and projecting into the space located above said work slide and transversely spaced from said tool slide; second rotary motion transmitting means connecting said stationary motion transmitting arrangement with said rotary work mounting means and extending in horizontal direction, said second rotary motion transmitting means constructed so as to be adapted to transmit rotary motion to said rotary work mounting means despite movement of the work slide along the horizontal guide on which it is mounted; rotary tool mounting means mounted on said tool slide rotatably about a horizontal axis, connected at one end to said drive means and projecting with its other end also into the space located above said work slide and transversely spaced from said tool slide; a work holder mounted on said rotary work mounting means and adapted to be rotated by said second rotary transmission means; and a tool holder mounted on said rotary tool mounting means and adapted to be rotated by said drive means, said tool holder and said work holder being both located in the space above said horizontally movable work slide and transversely spaced from said vertically movable tool slide.

4. The combination as set forth in claim 3, said first rotary motion transmitting means including a driven main shaft, said rotary tool mounting means including a tool spindle, said rotary work mounting means including a vertical work spindle, a first driving connection between said main shaft and said tool spindle, and a second driving connection between said main shaft and said work spindle, said second rotary motion transmitting means constituting a part of said second driving connection.

5. The combination set forth in claim 4, wherein at least one of said driving connections includes mating gears and at least one of said mating gears comprises means for eliminating backlash between the teeth of said gears.

6. The combination as set forth in claim 4, wherein at least one of said driving connections comprises an externally splined worm shaft and an internally splined worm axially movably mounted on said worm shaft.

7. The combination as set forth in claim 4, wherein said first driving connection between said main shaft and said tool spindle comprises two groups of intermeshing gears, and wherein said second driving connection between said main shaft and said work spindle, comprises five groups of intermeshing gears.

8. The combination as set forth in claim 7, wherein one of said five groups of intermeshing gears constitutes an index change gear and wherein said second driving connection further includes a gear mounted on and driven by said main shaft.

9. The combination set forth in claim 8, wherein another of said five groups of said intermeshing gears constitutes a reversing gear driven by said index change gear, the third of said five groups comprising an externally splined vertical shaft driven by said reversing gear and an internally splined rotary cylinder mounted in said frame means; the fourth of said five groups comprising a horizontal worm shaft and a pair of mating bevel gears one of which is mounted on said cylinder and the other of which is mounted on said worm shaft, and the fifth of said five groups comprising a worm on said worm shaft and a worm wheel meshing with said worm and mounted on said work spindle.

References Cited by the Examiner
UNITED STATES PATENTS

| | | | |
|---|---|---|---|
| 1,218,044 | 3/1917 | Beaman | 29—21 |
| 1,230,940 | 6/1917 | Schurr | 90—4 |
| 1,516,477 | 11/1924 | Schofield | 90—4 |
| 1,699,264 | 1/1929 | Zimmermann | 90—4 |
| 2,296,270 | 9/1942 | Cross | 90—1.4 |
| 2,440,901 | 5/1948 | Larson | 74—409 |
| 2,729,033 | 1/1956 | Prucknicki et al. | 51—287 X |
| 2,773,427 | 12/1956 | Barish | 90—4 |
| 2,845,809 | 8/1958 | Hetzel | 74—440 |
| 2,891,450 | 1/1959 | Freudiger | 90—4 |
| 2,924,151 | 2/1960 | Ufert | 90—4 |
| 2,968,965 | 1/1961 | Swanson et al. | 74—409 |
| 2,971,356 | 2/1961 | Reuter et al. | 64—27 |
| 2,991,636 | 7/1961 | Page | 64—27 |
| 3,037,396 | 1/1962 | Martin | 74—409 |

FOREIGN PATENTS

| | | |
|---|---|---|
| 1,007,829 | 2/1952 | France. |
| 1,027,033 | 3/1958 | Germany. |

WILLIAM W. DYER, Jr., *Primary Examiner.*

LEON PEAR, ANDREW R. JUHASZ, *Examiners.*